United States Patent [19]
Word

[11] Patent Number: 5,651,590
[45] Date of Patent: Jul. 29, 1997

[54] MULTI-DISC VEHICLE WHEEL AND PROCESS FOR MANUFACTURING SAME

[75] Inventor: James A. Word, Canton, Mich.

[73] Assignee: Hayes Wheels International, Inc., Romulus, Mich.

[21] Appl. No.: 570,282

[22] Filed: Dec. 11, 1995

[51] Int. Cl.⁶ .................................................. B60B 3/08
[52] U.S. Cl. ............................... 301/64.2; 301/63.1
[58] Field of Search ............................... 301/63.1, 64.1, 301/64.2, 64.3, 95, 96, 97, 98; 29/894.32, 894.322, 894.323

[56] References Cited

U.S. PATENT DOCUMENTS

| | | | |
|---|---|---|---|
| 4,316,637 | 2/1982 | Reynolds et al. | 301/64.3 X |
| 5,458,401 | 10/1995 | Baccman | 301/37.43 |
| 5,526,977 | 6/1996 | Wei | 29/894.322 X |

FOREIGN PATENT DOCUMENTS

| | | | |
|---|---|---|---|
| 3038001 | 2/1988 | Japan | 301/64.3 |
| 3258202 | 10/1988 | Japan | 301/63.1 |
| 3315302 | 12/1988 | Japan | 301/64.3 |

*Primary Examiner*—Russell D. Stormer
*Attorney, Agent, or Firm*—MacMillan, Sobanski & Todd

[57] ABSTRACT

A vehicle wheel including a wheel rim having a central axis and a plurality of generally parallel wheel discs extending across the wheel rim. The wheel discs are spaced axially apart and are generally perpendicular to the central axis. The wheel discs are permanently secured to the wheel rim.

13 Claims, 6 Drawing Sheets

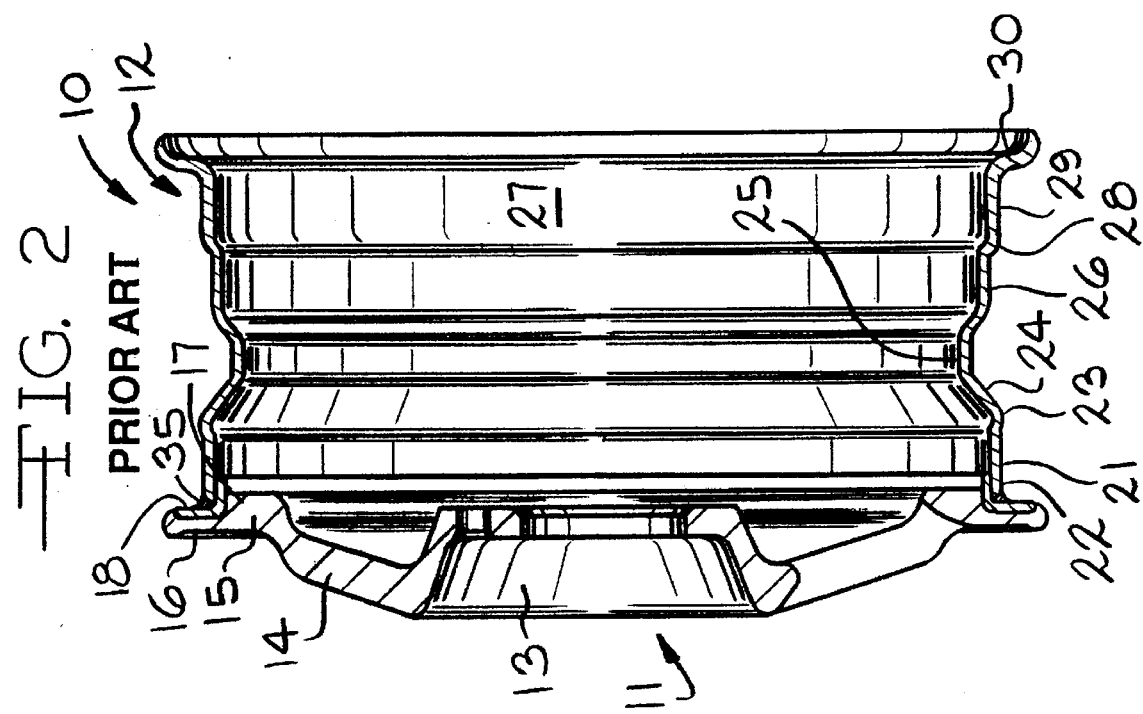
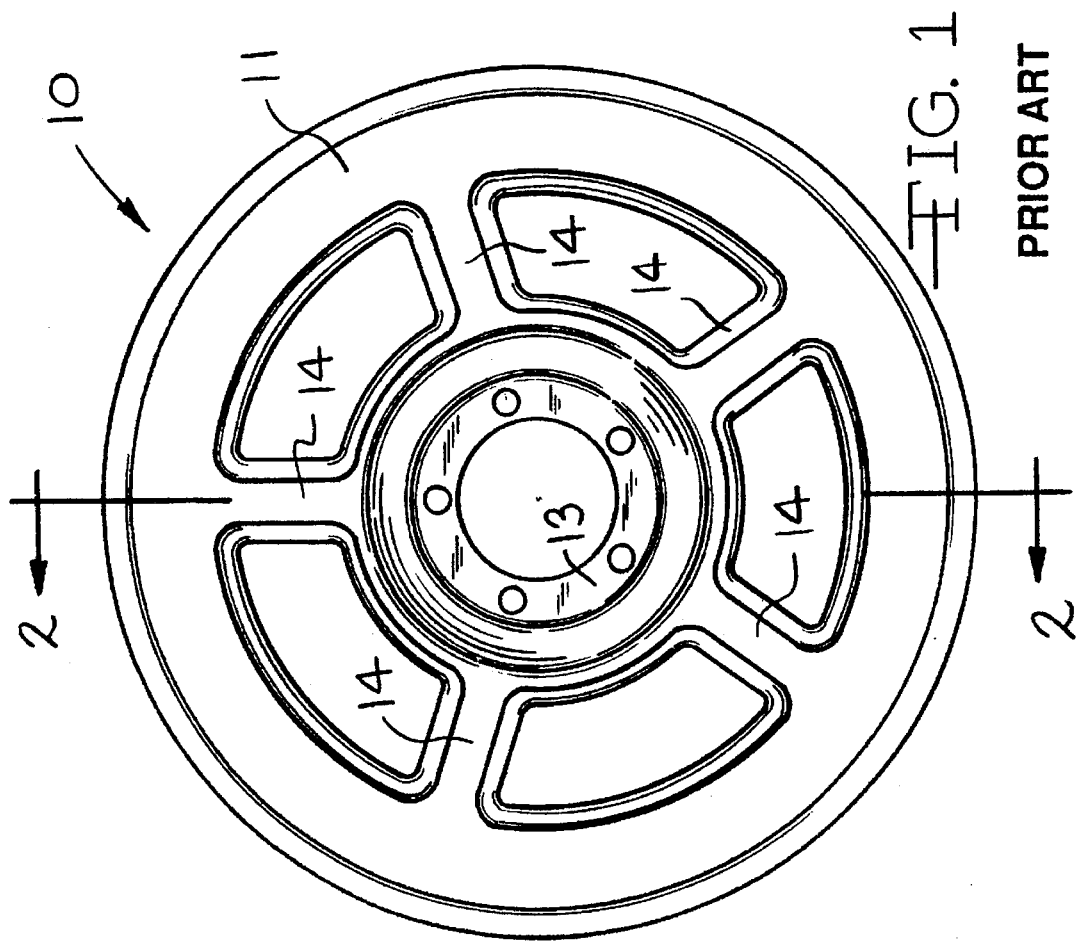

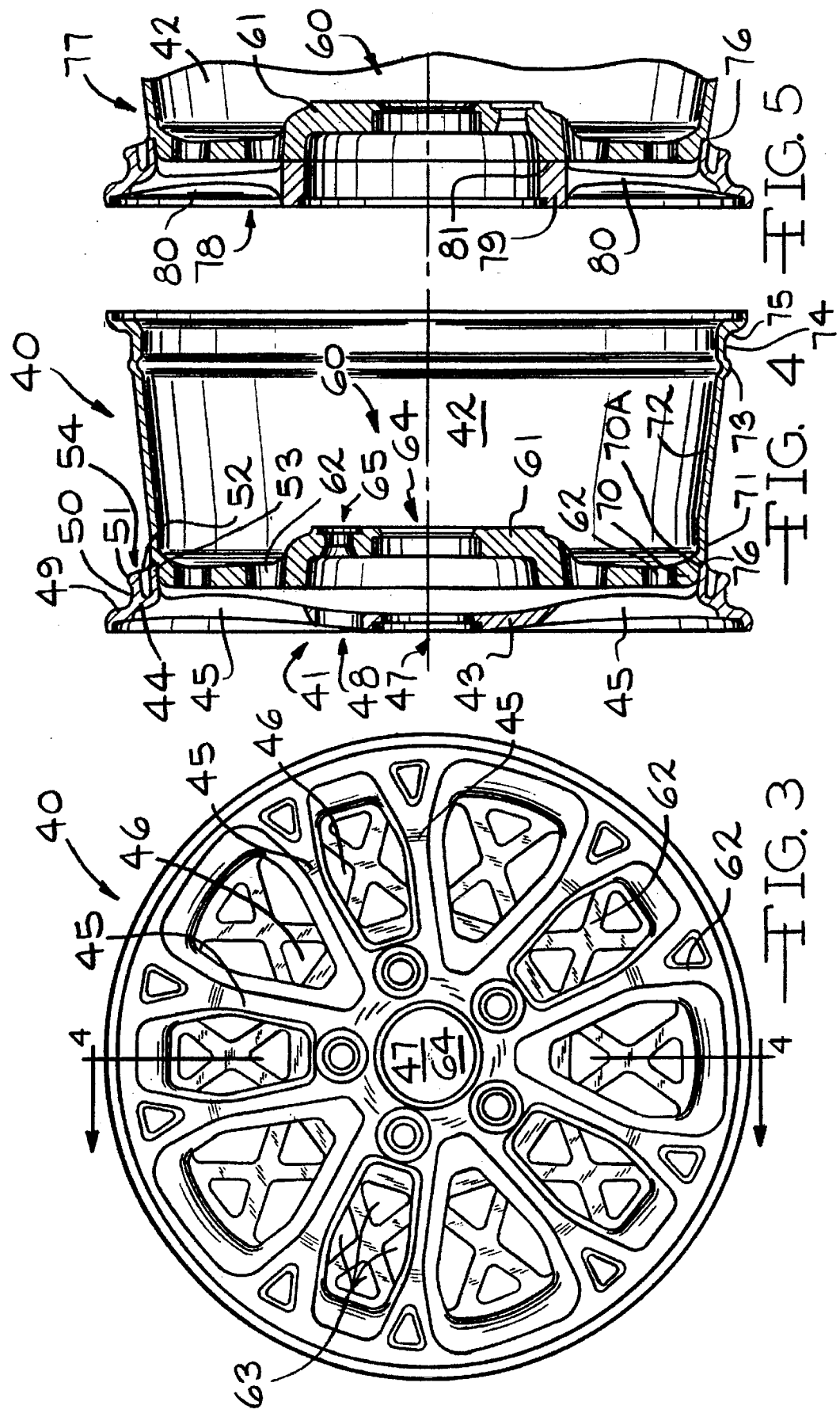

5,651,590

MULTI-DISC VEHICLE WHEEL AND PROCESS FOR MANUFACTURING SAME

BACKGROUND OF THE INVENTION

This invention relates in general to vehicle wheels and in particular to multi-piece wheels having a plurality of wheel discs.

It is known in the art to fabricate a vehicle wheel by attaching a wheel disc to a separately formed wheel rim. The wheel disc is typically cast or forged from a light weight metal, such as aluminum, titanium or magnesium, or an alloy of a light weight metal. The wheel disc can have a pleasing ornamental appearance with styled three dimensional contours. Additionally, casting or forging a disc is a simpler process than casting or forming an entire wheel. This is because the disc casting and corresponding mold are smaller than the casting and mold for an entire wheel.

The wheel rim is typically rolled; however, it also can be cast or forged. The wheel rim can be formed from the same metal or alloy as the wheel disc or from a metal which is different from the metal forming the wheel disc. A wheel having a rim and disc formed from two different metals is referred to a bimetal wheel. A common bimetal wheel includes a wheel rim rolled from a steel alloy attached to a wheel disc cast from a light weight metal alloy, such as an aluminum alloy. Rolling the wheel rim from steel provides strength, increased economy and flexibility. The wheel rim is permanently attached to the wheel disc by a conventional process, such as welding, brazing or soldering.

To further enhance the appearance of a bimetal wheel, it is known to extend the wheel disc in a radial direction to include the outboard tire retaining flange. Such a wheel disc is referred to as a full face wheel disc. The full face wheel disc is attached to a truncated outboard end of a partial wheel rim. The assembled full face wheel disc and partial wheel rim is called a full face wheel. When a tire is mounted upon a full face wheel, only the wheel disc is visible and the joint between the wheel disc and wheel rim is completely hidden. As a result, the wheel appears to be formed entirely from the wheel disc metal. The aesthetic appearance of the wheel is improved while the manufacturing and finishing processes are simplified.

Referring now to FIGS. 1 and 2, there is shown, generally at 10, a typical prior art bimetal full face wheel which is disclosed in U.S. Pat. No. 5,421,642 to Archibald. The wheel 10 includes a full face wheel disc 11 attached to the outboard end of a partial wheel rim 12. The wheel disc 11 is formed from a light weight metal or light weight metal alloy by a conventional process, such as gravity, low pressure or die casting, or forging. The wheel disc 11 includes a central wheel hub 13 which is supported by a plurality of wheel spokes 14 within an annular sidewall 15. An outboard tire retaining flange 16 extends in an outward radial direction from the sidewall 15. An outboard tire bead seat 16 is formed adjacent to the tire retaining flange 15. A cylindrical collar 17 which extends axially towards the inboard end of the wheel 10 is formed on the inboard surface of the sidewall 15. An annular weld anchor 18 is secured to the inboard surface of the wheel disc sidewall 15. The weld anchor is formed from a metal which is similar to the metal forming the wheel rim 12 to assure that a good weld is formed therebetween.

The wheel rim 12 is typically formed from steel strip stock with conventional rim roll forming machinery. Alternately, the wheel rim 12 can be cast or forged. The wheel rim 12 includes an outboard cylindrically shaped end 21 which forms an outboard tire bead seat 21. The wheel rim end 12 extends axially over the wheel disc collar 17. The wheel rim outboard end 21 also includes an outboard safety hump 23 and a deepwell wall 24. A deepwell 25 is formed in the wheel rim 12 adjacent to the deepwell wall 24. A leg portion 26 extends axially from the deepwell 25 toward an inboard end 27 of the wheel rim 12. An inboard safety hump 28 and inboard tire bead seat 29 are formed adjacent to the leg portion 26 on the inboard end 27 of the wheel rim 12. An inboard tire retaining flange 30 extends in an outward radial direction from the inboard wheel rim end 27.

The wheel rim 12 is secured to the wheel disc 11 by a continuous circumferential air-tight weld 35. The weld 35 is formed between the weld anchor 18 and the outboard end of the wheel rim 12 by a conventional welding process.

SUMMARY OF THE INVENTION

This invention relates to a vehicle wheel formed from multiple components having a plurality of generally parallel wheel discs and a process for manufacturing same.

The present invention contemplates forming a vehicle wheel which includes a wheel rim having a central axis and a plurality of parallel wheel discs extending across the wheel rim. The wheel discs are generally perpendicular to the central axis and spaced apart axially.

The preferred embodiment of the vehicle wheel includes a partial wheel rim having an inner wheel disc formed integrally therewith. The inner wheel disc extends across the outboard end of the wheel rim. An outer full face wheel disc is secured to the outboard end of the wheel rim with an air-tight circumferential weld.

The invention also contemplate a process for manufacturing a vehicle wheel comprising first forming a wheel rim having an inner wheel disc extending thereacross. An outer wheel disc is then formed and positioned adjacent to the outboard end of the wheel rim and concentric thereto. The wheel disc is secured to the outboard end of the partial wheel rim.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a plan view of a prior art vehicle wheel.

FIG. 2 is a sectional view of the vehicle wheel shown in FIG. 1 taken along line 2—2.

FIG. 3 is a plan view of a vehicle wheel in accordance with the present invention.

FIG. 4 is a sectional view of the vehicle wheel shown in FIG. 3 taken along line 4—4.

FIG. 5 is a partial sectional view of an alternate embodiment of the vehicle wheel shown in FIG. 4.

DETAILED DESCRIPTION OF THE PREFERRED EMBODIMENT

Figure 6:
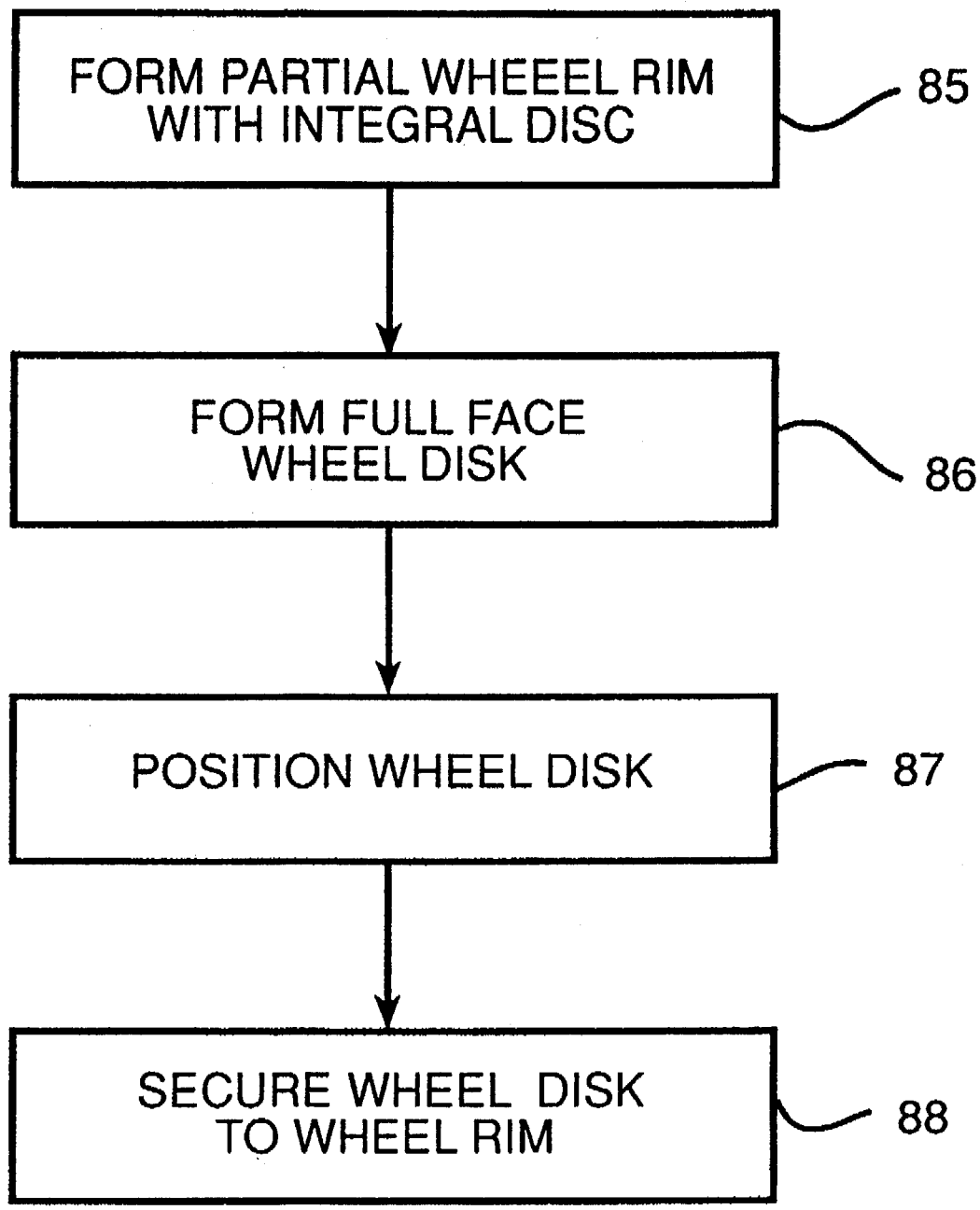
FIG. 6 is a flow chart of a process for fabricating the vehicle wheel shown in FIGS. 3 and 4.

Referring again to the drawings, there is illustrated in FIGS. 3 and 4, a vehicle wheel 40 in accordance with the present invention. As best seen in FIG. 4, the wheel 40 includes a full face outer wheel disc 41 attached to a partial wheel rim 42. In the preferred embodiment, the outer wheel disc 41 is formed by a conventional process, such as casting or forging, from an alloy of a light weight metal, such as aluminum, magnesium or titanium. However, the outer wheel disc 41 can be formed from other materials, including steel or plastic.

The outer wheel disc 41 has a central outer hub 43 supported within an annular sidewall 44 by a plurality of radial outer wheel spokes 45. The outer wheel spokes 45 define a plurality of openings 46 which extend through the outer wheel disc 41. An outer pilot hole 47 extends through the center of the outer hub 43. A plurality of access holes 48 also extend through the outer hub 43 and are equally circumferentially spaced about a circle which is concentric with the outer pilot hole 47. The purpose for the access holes 48 will be explained below.

As in the prior art wheel 10 described above, the sidewall 44 has an outboard tire retaining flange 49 extending in an outward radial direction therefrom. Additionally, an outboard tire bead seat 50 and safety hump 51 are formed on the outer surface of the side wall 44. A deepwell wall 52 extends radially across the inboard face of the side wall 44 from the safety hump 51 to a cylindrical collar 53. The collar 53 extends axially from the inboard face of the sidewall 44. A plurality of lightener pockets 54, two of which are shown, extend axially into the deepwell wall 52 beneath the tire bead seat 50. The lightener pockets 54 are spaced equally about the circumference of the side wall 44. Alternately, a single continuous channel (not shown) can be formed in the sidewall 44.

The partial wheel rim 42 is formed by a conventional process, such as casting of forging. In the preferred embodiment, an alloy of a light weight metal, such as aluminum, magnesium or titanium is used to form the wheel rim 42; however, other materials such as steel or plastic also can be used. An inner wheel disc 60 is formed integrally with the wheel rim 42 and extends across the inboard end thereof. As shown in FIG. 4, the inner wheel disc 60 is generally parallel to the outer wheel disc 41 and spaced axially apart therefrom. The inner wheel disc 60 has a central inner hub 61 supported within the wheel rim 42 by a plurality of radial inner wheel spokes 62. The inner wheel spokes 62 define a plurality of openings 63 which extend through the inner wheel disc 60. As best seen in FIG. 3, pairs of the inner wheel spokes cross to form "X" shapes which extend behind or overlap the openings 46 in the outer wheel disc 41 and are visible therethrough.

An inner pilot hole 64 extends through the center of the inner hub 61. A plurality of wheel stud holes 65 also extend through the inner hub 61 and are equally spaced about a circle which is concentric with the inner pilot hole 64. Each of the wheel stud holes 65 is aligned with a corresponding access hole 48 formed through the outer wheel disc 41. The wheel stud holes 65 receive wheel studs (not shown) for mounting the wheel 40 on a vehicle. Wheel nuts (not shown) are threaded onto the wheel studs to secure the wheel 40 on the vehicle. The access holes 48 formed in the outer wheel hub 43 are sized sufficiently large to receive the end of a socket wrench for tightening or loosening the wheel nuts.

The outboard end of the wheel rim 42 has a reduced diameter end portion 70 which defines a radially extending shoulder 70A. As shown in FIG. 4, the outer wheel disc collar 53 extends axially over the wheel rim end portion 70 to rest against the shoulder 70A. The wheel rim 42 includes a deepwell 71 which extends axially from the end portion shoulder 70A to a leg portion 72. The leg portion 72 terminates in an inboard safety hump 73. An inboard tire bead seat 74 is adjacent to the inboard safety hump 73. An inboard tire retaining flange 75 extends in an outward radial direction from the inboard end of the wheel rim 42.

The outer wheel disc 41 is permanently secured to the wheel rim 42 with the outer wheel disc 41 concentric with the wheel rim 42 and generally parallel to the inner wheel disc 60. Additionally, both wheel discs 41 and 60 are perpendicular to the axis of the wheel 40. As described above, the collar 53 formed on the inboard face of the enter wheel disc 41 extends over the wheel rim end portion 70 to the shoulder 70A.

In the preferred embodiment, a continuous circumferential air-tight weld 76 is formed between the end of the collar 53 and the wheel rim shoulder 70A. For a bimetal wheel, a weld anchor (not shown) can be included in the outer wheel disc 41 or the wheel rim 42 to assure formation of a good weld therebetween. It will be appreciate& that other conventional processes can be used to secure the outer wheel disc 41 to the wheel rim 42. For example the outer wheel disc 41 can be brazed or soldered onto the wheel rim 42.

The overlapping of the two parallel wheel discs 41 and 60 provides a depth to the wheel 40 which is not attainable with the prior art wheel 10. The use of two wheel discs 41 and 60 facilitates the production of complex and intricate wheel designs. Additionally, the two wheel discs 41 and 60 can be given different surface finishes before final wheel assembly. For example, the surfaces of the inner and outer wheel discs 60 and 41 can be given coatings of contrasting colors to highlight the depth of the finished wheel. Applying the coatings to the wheel discs 60 and 41 before assembly, simplifies the wheel finishing process.

It will be appreciated that the specific wheel disc design shown in FIGS. 3 and 4 is intended to be illustrative of the invention. Thus, the invention can be practiced with outer and inner wheel discs 41 and 60 having other pleasing aesthetic shapes. For example, holes of various diameters can be formed through the wheel discs 41 and 60 in lieu of wheel spokes 45 and 62 and the corresponding spaces 46 and 63. The inner wheel disc 60 carries the vehicle weight while the outer wheel disc hub 43 and outer wheel spokes 45 are non-load bearing. Thus, the outer wheel disc hub 43 and outer wheel spokes 45 are decorative and accordingly can be made thinner than the corresponding inner wheel disc portions.

An alternate embodiment 77 of the wheel 40 is shown in FIG. 5. Portions of the vehicle wheel 77 which are the same as corresponding portions of the vehicle wheel 40 described above are identified by the same numerical designator. The wheel 77 includes a full face outer wheel disc 78 attached to the outboard end of a partial wheel rim 42. The outer wheel disc 78 has a central annular ring 79 supported within the annular sidewall 44 by a plurality of radial outer wheel spokes 80. The central ring 79 extends axially to contact the hub 61 of the inner wheel disc 60. The outer wheel disc 78 is attached to the wheel rim 42 by an outer air-tight circumferential weld 76 as described above and an inner weld 81 formed between the central ting 79 and the inner wheel disc hub 61. It is not necessary that the inner weld 81 be air tight. In the preferred embodiment, the inner weld 81 consists of a plurality of spot welds spaced equally about the inner circumference of the central ring 79. The wheel 77 distributes the load of the vehicle through the two welds 76 and 81. Accordingly, the components of the inner and outer wheel discs 60 and 78 may be made thinner.

The present invention also contemplates a process for manufacturing the wheel 40 illustrated in FIGS. 3 and 4. A flow chart for the process is shown in FIG. 6. A partial wheel rim having an integral wheel disc extending across its outboard end is formed in functional block 85. The wheel rim also is formed having an inboard tire retaining flange formed on its inboard end. The partial wheel rim is formed by a conventional process, such as casting or forging. A full face wheel disc which includes an outboard tire retaining flange is formed in functional block 86 by a conventional process, such as casting or forging. In the preferred embodiment, the partial wheel rim is formed from a first metal alloy and the full face wheel disc is formed from a second metal alloy which is different from the first metal alloy; however, the partial wheel rim and full face wheel disc can be formed from the same metal alloy. Additionally, one or both of the wheel disc and wheel rim can be formed form a non-metallic material, such as a plastic.

In functional block 87, the full face wheel disc is positioned adjacent to the outboard end of the partial wheel rim with the wheel disc concentric to the wheel rim and the outboard tire retaining flange parallel to the inboard tire retaining flange. In the preferred embodiment, the wheel rim and full face wheel disc are placed in a special wheel fixture to assure proper alignment therebetween; however, the use of a fixture is optional.

The full face wheel disc is permanently secured to the outboard end of the partial wheel rim in functional block 88. In the preferred embodiment, an air-tight continuous circumferential weld is formed in functional block 88 between the wheel disc and the wheel rim; however, other conventional methods can be used, such as, brazing or soldering.

Another alternate embodiment of the invention is illustrated generally at 90 in the exploded partial sectional view of a vehicle wheel shown in FIG. 6. Portions of the vehicle wheel 90 which are the same as corresponding portions of the vehicle wheel 40 described above are identified by the same numerical designator. The wheel 90 shown in FIG. 7 includes a partial wheel rim 91 having an inner wheel disc 92 formed across the outboard end thereof. The inner wheel disc hub 61 has a reduced diameter inboard end which defines a radial shoulder 94. As described above, an outer wheel disc 41 is permanently attached to the outboard end of the wheel rim 91.

The wheel 90 further includes an inboard wheel disc formed as a wheel spider 95. The wheel spider 95 is disposed within the wheel rim 91 adjacent to the inboard face of the inner wheel disc hub 61 and has a center hub 96 which is supported within an annular ring 97 by a plurality of spokes 98. A pilot hole 99 extends through the center of the hub 96 and receives the inboard end 93 of the inner wheel disc hub 61. The wheel spider hub 96 engages the radial shoulder 94 formed on the inner hub 61 while the annular ring 96 contacts the inner surface of the wheel rim 91. The spider 95 is permanently secured to the wheel 90 by a conventional method, such as spot welding the spider hub 96 to the inner wheel disc hub 61 or spot welding the annular ring 97 to the inner surface of the wheel rim 91. It will be appreciated that the spider 95 also can be formed having a central hub with a plurality of spokes extending radially therefrom (not shown). The spokes would terminate on the inner surface of the wheel rim 91.

While the wheel 90 shown in FIG. 6 includes three wheel discs 41, 92 and 95, the present invention contemplates a plurality of generally parallel wheel discs to provide a multitude of design possibilities. The invention further contemplates that the wheel discs can be formed from the same material as the wheel rim or from different materials. For example, the wheel rim and outer disc can be formed from different metal alloys while the inboard wheel disc can be formed from a plastic material and bonded to the inner wheel disc hub.

Figure 8:
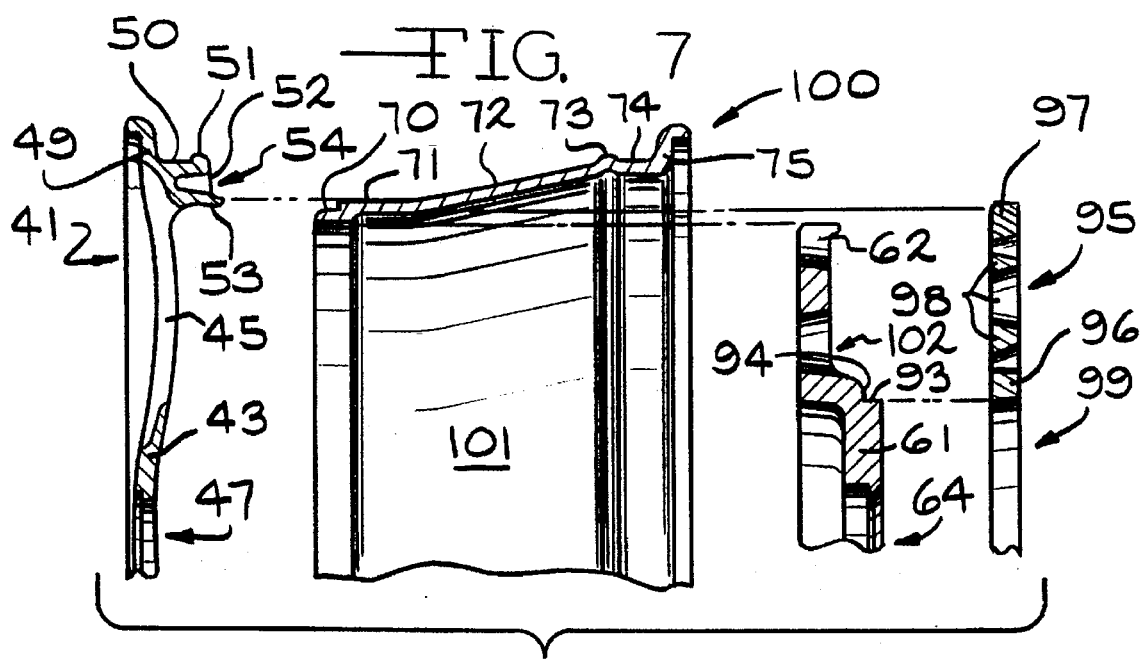
FIG. 8 is a exploded partial sectional view of another embodiment of the vehicle wheel shown in FIG. 3.

An alternate embodiment of the vehicle wheel 90 is shown generally at 100 in FIG. 8. Portions of the vehicle wheel 100 which are the same as corresponding portions of the wheel 90 are identified with the same numerical designator. The wheel 100 includes a partial wheel rim 101 having an open outboard end. The wheel 100 further includes a separately formed inner wheel disc 102 which is disposed within the outboard end of the wheel rim 101. The inner wheel disc 102 is permanently secured to the wheel 101 by a conventional process, such as spot welding. The wheel also includes an outer wheel disc 41 and a wheel spider 95, as described above.

Forming the inner wheel disc 102 separately from the wheel rim 101 provides greater flexibility in manufacturing the wheel by allowing the inner wheel disc 102 and the wheel rim 101 to formed from the same material or from different materials. For example, the wheel 100 can include an inner wheel disc 102 cast from a light-weight metal, such as an aluminum alloy, which would match the metal used to form the outer wheel disc 41 and the wheel spider 95 while the wheel rim 101 can be rolled from steel. The use of steel for the wheel rim 101 decreases the cost of the wheel 100 while increasing the strength thereof.

Figure 9:
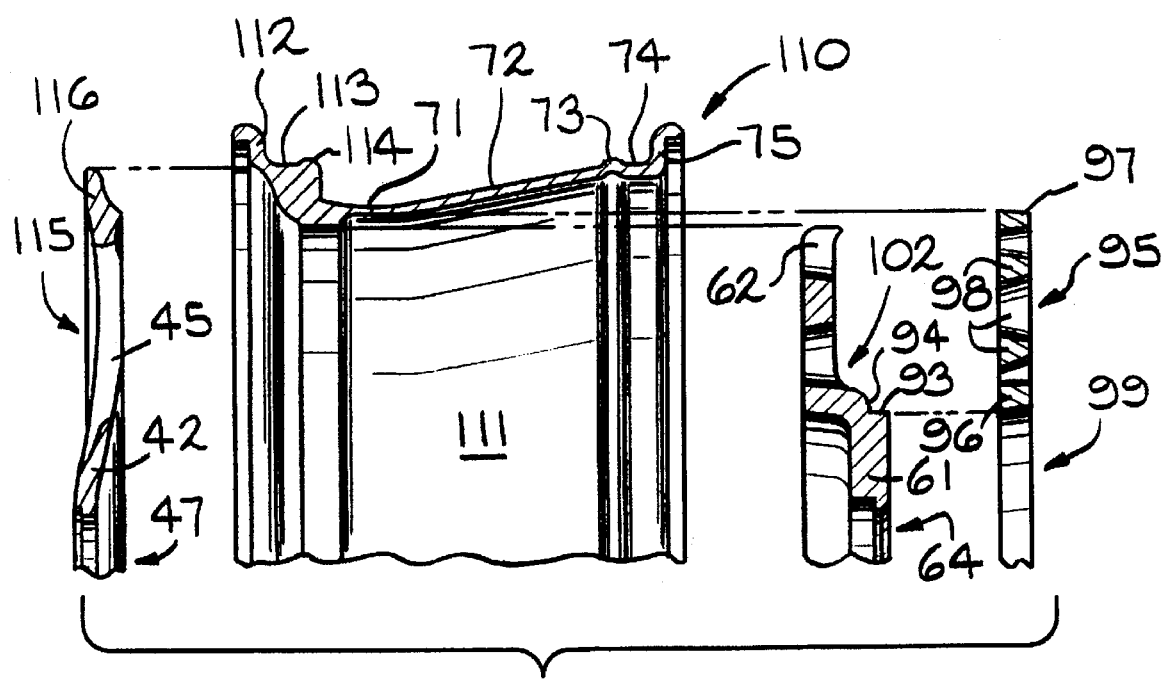
FIG. 9 is a exploded partial sectional view of a vehicle wheel in accordance with the present invention which has a full wheel rim.

An alternate embodiment of the vehicle wheel 100 is shown generally at 110 in FIG. 9. Portions of the vehicle wheel 110 which are the same as corresponding portions of the wheel 110 are identified with the same numerical designator. The wheel 100 includes a full wheel rim 111. Accordingly, an outboard tire retaining flange 112, tire bead seat 113 and safety hump 114 are formed on the outboard end of the wheel rim 111. An outer wheel disc 115 is disposed within the outboard end of the wheel rim 111. The outer wheel disc 115 includes a central hub 43 supported within an annular ring 116 by a plurality of radial spokes 45. The outer wheel disc 115 is permanently secured to the wheel rim 111 by a conventional process, such as, for example, spot welding. Because a full wheel rim 111 is used, a circumferential air-tight weld attaching the outer wheel disc 115 to the wheel rim 111 is not necessary. This simplifies the manufacturing process while reducing the rejection rate for completed wheels. As shown in FIG. 9, the wheel 110 also includes an inner wheel disc 102 and a wheel spider 95 as described above; however, the invention also contemplates forming the wheel with only the inner wheel disc 102.

Figure 7:
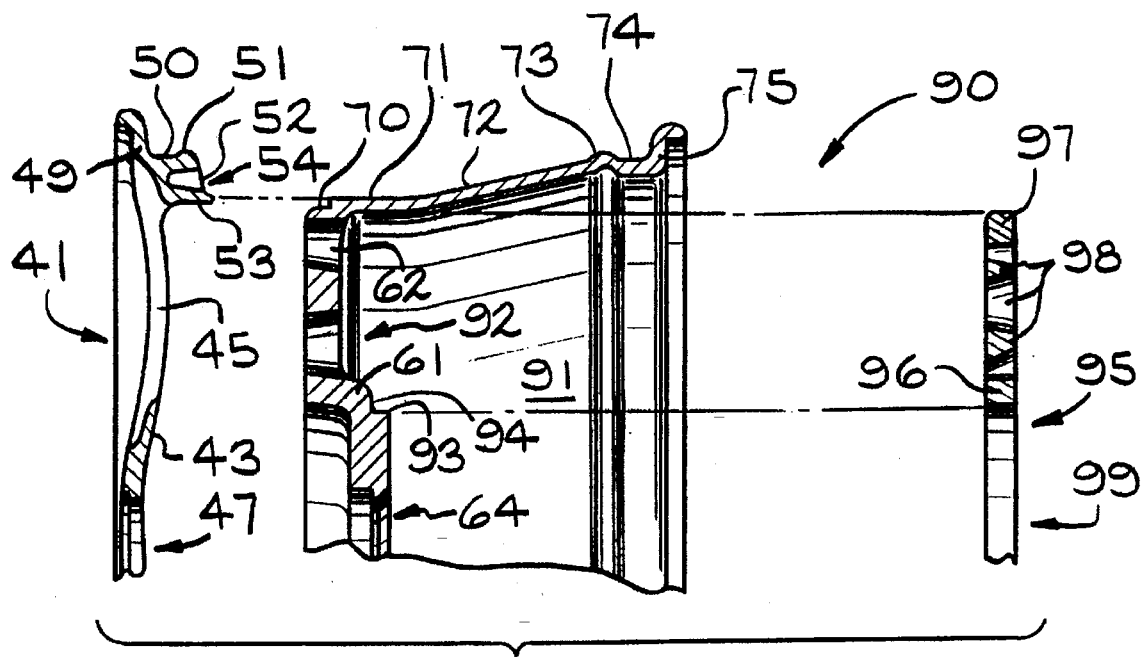
FIG. 7 is an exploded partial sectional view of an alternate embodiment of the vehicle wheel shown in FIG. 3.

The present invention also contemplates a process for manufacturing the wheels shown in FIGS. 7 through 9. It will be appreciated that the process illustrated in FIG. 6 can be modified to manufacture the wheel 90 shown in FIG. 7. Additional steps of forming the inboard wheel spider 95, positioning the spider 95 within the wheel rim 91 and securing the spider 91 to the rim 91 or the inner wheel disc 61 would be added after functional block 88.

Figure 10:
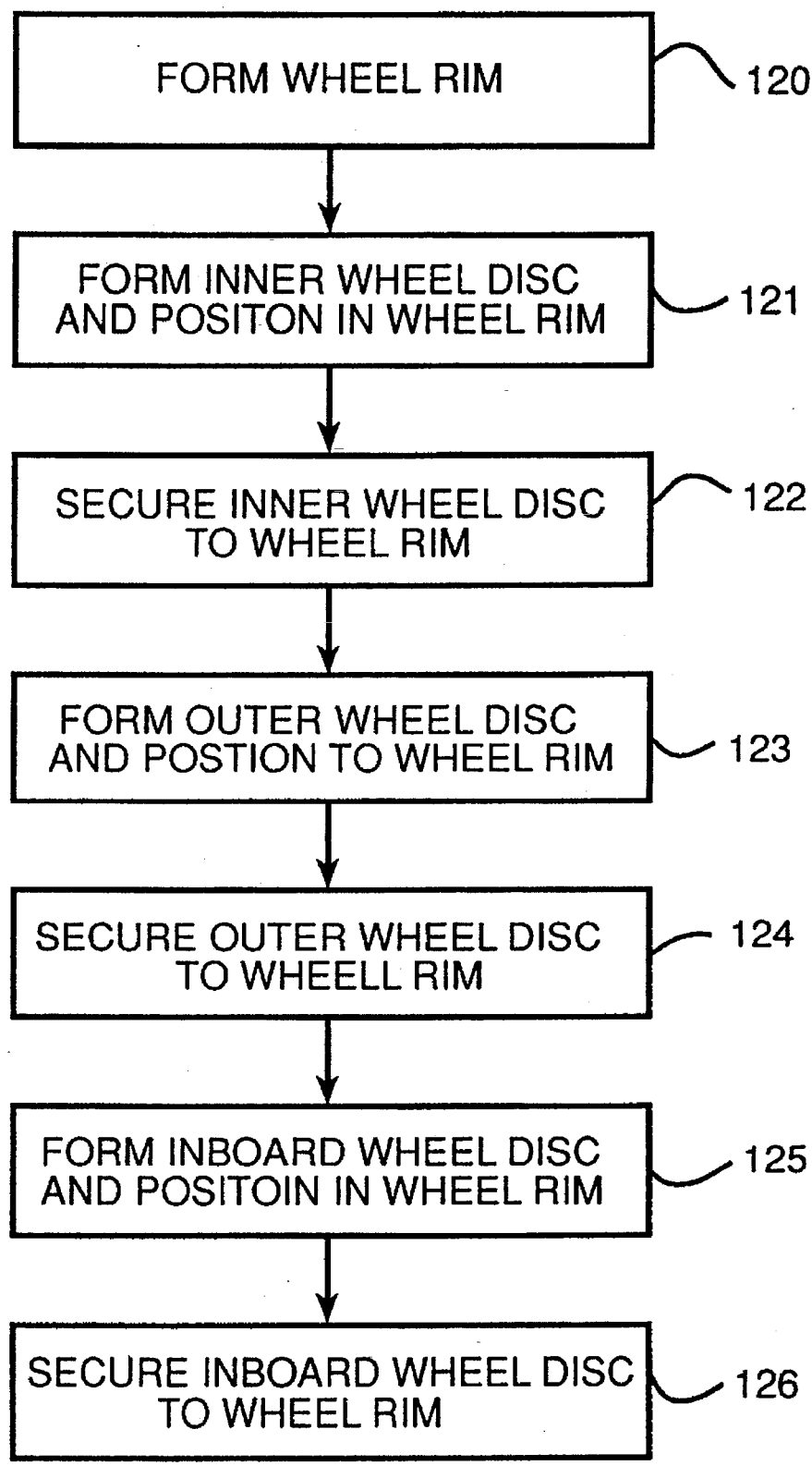
FIG. 10 is a flow chart of a process for fabricating the vehicle wheels shown in FIGS. 8 and 9.

A process for manufacturing the wheels 100 and 110 shown in FIGS. 8 and 9 is shown in the flow chart in FIG. 10. A wheel rim is formed in functional block 120. For the wheel 100 shown in FIG. 8, a partial wheel rim is formed while for the wheel 110 shown in FIG. 9, a full wheel rim is formed. The wheel rim is formed by a conventional process, which can include rolling since the wheel rim does not include an integral wheel disc. Alternately, as described above, the wheel rim can be cast or forged. In functional block 121, an inner wheel disc is formed and positioned relative to the wheel rim. The inner wheel disc is permanently secured to the wheel rim in functional block 122 by a conventional process, such as spot welding. The outer wheel disc is formed and positioned relative to the wheel rim in functional block 123. For the wheel 100 shown in FIG. 8, a full face wheel disc is formed. The outer wheel disc is permanently secured to the wheel rim in functional block 124 by a conventional process. In the preferred embodiments, a continuous air-tight circumferential weld is formed between the outer wheel disc and the wheel rim for the wheel 100 shown in FIG. 8, while the outer wheel disc is spot welded to the wheel rim for the wheel 110 shown in FIG. 9. At, inboard wheel disc or spider is formed in functional block 125 and positioned within the wheel rim adjacent to the inboard face of the inner wheel disc. In functional block 126, the inboard wheel disc or spider is permanently attached to the wheel rim by a conventional process, such as spot welding. While the preferred embodiment of the manufacturing process has been described above, it will be appreciated that the process can be practiced with several of the above described steps combined. For example, two or all three of the wheel discs can be positioned relative to the wheel rim in the same step. Furthermore, several wheel discs can be secured to the wheel rim in the same step.

The present invention also contemplates rotating the outer wheel disc relative to the inner wheel disc to reveal alternate features of the inner disc and thereby produce right and left hand wheels from the same wheel components. Additionally, an asymmetric wheel can be produced which would be naturally balanced about its axis of rotation. For example, the outer wheel disc could be formed with three spokes while the inner wheel disc is formed with five wheel spokes.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. It will be appreciated that the specific structural details shown in one illustrated embodiment of the invention can be practiced in the other illustrated embodiments. For example, the separate inner wheel disc 102 illustrated shown in FIG. 8 can be included in the structure of the wheel 40 shown in FIGS. 3 and 4. Additionally, it also will be appreciated that the processes for manufacturing the wheels described above can be applied to produce wheels having a plurality of generally parallel wheel discs.

What is claimed is:

1. A vehicle wheel comprising:

a partial wheel rim having an inboard tire bead seat formed on an inboard end thereof;

an inner wheel disc formed integrally across an outboard end of said partial wheel rim, said inner wheel disc including a central hub supported by a plurality of spokes; and an outer wheel disc having an outboard tire bead seat formed on the circumference thereof and including a central hub supported by a plurality of spokes, said outer wheel being permanently secured to said outboard end of said partial wheel rim.

2. A vehicle wheel as described in claim 1 wherein said outer wheel disc and said inner wheel disc are spaced axially apart from one another.

3. A vehicle wheel as described in claim 2 wherein said outer wheel disc is secured to said partial wheel rim with an air-tight circumferential weld formed between the outer circumference of said outer wheel disc and said partial wheel rim.

4. A vehicle wheel as described in claim 3 wherein said circumferential weld is a first weld and further wherein said outer wheel disc hub being secured to said inner wheel disc hub by a second weld.

5. A process for manufacturing a vehicle wheel comprising the steps of:

(a) forming a partial wheel rim having an inboard tire bead seat formed on an inboard end thereof and an inner wheel disc formed integrally across an outboard end thereof, the inner wheel disc including a central hub supported by a plurality of spokes;

(b) forming an outer wheel disc having an outboard tire bead seat formed on the circumference thereof and including a central hub supported by a plurality of spokes;

(c) positioning the outer wheel disc adjacent to the outboard end of the wheel rim and concentric thereto; and (d) permanently securing the outer wheel disc to the outboard end of the partial wheel rim.

6. The process according to claim 5 further including, subsequent to step (d), the following steps:

(e) forming another wheel disc;

(f) positioning the wheel disc formed in step (e) within the wheel rim adjacent to an inboard surface of the inner wheel disc; and (g) permanently securing the wheel disc formed in step (e) to the wheel.

7. The process according to claim 6 wherein the inboard wheel disc formed in step (e) is a wheel spider having a central hub supported by a plurality of spokes.

8. The process according to claim 5 wherein step (d) includes forming an air-tight circumferential weld between the outer wheel disc and the outboard end of the wheel rim.

9. The process according to claim 8 wherein the air-tight circumferential weld is a first weld and further wherein step (d) also includes forming a second weld between the hub of the outer wheel disc and the hub of the inner wheel disc.

10. The process according to claim 8 wherein in step (a) the partial wheel rim is formed from a first metal alloy and in step (b) the outer wheel disc is formed form a second metal alloy, the second metal alloy being different from the first metal alloy.

11. A vehicle wheel formed by the process described in claim 5.

12. A vehicle wheel comprising:

an annular wheel rim having an inboard tire bead seat formed on an inboard end thereof and an outboard tire bead seat formed on an outboard end thereof, said wheel rim defining a central axis;

an inner wheel disc having a central hub supported by a plurality of spokes, said inner wheel disc being disposed within said wheel rim and being generally perpendicular to said wheel rim axis; said inner wheel disc being permanently attached to an interior surface of said wheel rim; and an outer wheel disc having a central hub supported by a plurality of spokes disposed within said wheel rim adjacent to said inner wheel disc, said outer wheel disc being permanently attached to said interior surface of said wheel rim.

13. A vehicle wheel as described in claim 12 wherein at least one of said wheel discs is a wheel spider having a central hub supported by a plurality of spokes.

* * * * *